United States Patent
Zaruba et al.

(10) Patent No.: US 8,179,253 B2
(45) Date of Patent: May 15, 2012

(54) LOCATION AND TRACKING SYSTEM, METHOD AND DEVICE USING WIRELESS TECHNOLOGY

(75) Inventors: Gergely V. Zaruba, Fort Worth, TX (US); Manfred Huber, Fort Worth, TX (US); David Levine, Fort Worth, TX (US); Farhad A. Kamangar, Arlington, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 205 days.

(21) Appl. No.: 12/563,598

(22) Filed: Sep. 21, 2009

(65) Prior Publication Data
US 2010/0134276 A1 Jun. 3, 2010

Related U.S. Application Data

(63) Continuation-in-part of application No. 11/335,337, filed on Jan. 19, 2006, now Pat. No. 7,592,909.

(51) Int. Cl.
*G08B 1/08* (2006.01)
(52) U.S. Cl. ......... 340/539.13; 340/539.21; 340/539.23; 340/6.1

(58) Field of Classification Search ............... 340/572.1, 340/539.13, 539.21, 539.23, 573.4, 6.1, 8.1
See application file for complete search history.

(56) References Cited

U.S. PATENT DOCUMENTS

| | | | | |
|---|---|---|---|---|
| 6,150,921 A | * | 11/2000 | Werb et al. | 340/10.1 |
| 6,154,139 A | * | 11/2000 | Heller | 340/573.4 |
| 6,720,922 B2 | * | 4/2004 | Williams et al. | 342/465 |
| 7,242,306 B2 | * | 7/2007 | Wildman et al. | 340/573.1 |

* cited by examiner

*Primary Examiner* — Toan N Pham
(74) *Attorney, Agent, or Firm* — Chowdhury & Georgakis, P.C.

(57) ABSTRACT

A system, method, and devices for locating an object, in which the system includes objects having location tags for projecting data about the object, a processing unit for receiving data about the object, and an algorithm for processing the data. Typically, the location tag includes at least one mobility sensor that projects sensory data about the object, a wireless transceiver that projects received signal strength indication data about the object and a microprocessor. The processing unit receiving the sensory data and the received signal strength indication data about the object. The algorithm processes the data, provides a location estimate about the object and thereby locates the object.

21 Claims, 5 Drawing Sheets

LOCATION AND TRACKING SYSTEM, METHOD AND DEVICE USING WIRELESS TECHNOLOGY

CROSS-REFERENCE TO RELATED APPLICATION

This is a Continuation-In-Part of application Ser. No. 11/335,337 filed Jan. 19, 2006, incorporated herein by reference.

STATEMENT REGARDING FEDERALLY SPONSORED APPLICATIONS

Not applicable.

BACKGROUND OF THE INVENTION

The present invention relates to systems and methods for locating, orienting, and tracking one or more objects (including humans), particularly objects equipped with one or more location tags using a wireless networking technology.

Location of objects and personnel is extremely important, especially when such objects and/or personnel are distributed over wide areas and expanses. Establishments, such as medical and health organizations, public transportation systems, banks, delivery services, the armed forces, and security systems, would benefit if they were able to locate items and personnel in their organization at any time, regardless of where they were positioned. To date, no such location or tracking system is available and there remains a need to accurately and cost-effectively identify the location of objects and/or personnel that exist as part of a larger system or organizational structure.

Existing techniques for location of objects include the use of infrared and laser systems, or of sonar, radar, or satellites (global positioning systems or GPS) as examples. Unfortunately, most of these techniques require additional infrastructure, reference points, or infrastructure sensors specifically for the purpose of localization. In addition, line-of-sight communication (wherein a transmitter and receiver are in visual contact with each other) is usually required with such technologies. Such techniques are thus limited in their application and use. There remains a need to offer improved location and tracking systems with minimal infrastructure components that are readily adaptable in today's high technology environment.

SUMMARY OF THE INVENTION

The present invention solves many problems associated with current technologies used for localization and location of an object (including humans).

Generally, the present invention is a system that locates objects, mobile or static, using a wireless network and cooperating location tags. In the present invention each object to be tracked is supplemented with a location tag, thus the location of the tag is the location of the object that it is tagging. The system can locate tags (and thus objects that are tagged with these tags) that are placed or moved inside the coverage area of the system.

The present invention takes advantage of readily available technology components, such as wireless communications systems (e.g., wireless local and personal area network technologies), mobility sensors (e.g., small micro-mechanical accelerometers and gyroscopes), and processing units (e.g., low-power microcontrollers) to locate and track (orient) one or more objects. Each object is provided with a location tag having a wireless transceiver unit, a microcontroller, and at least one mobility sensor.

In one form of the present invention, location of an object having a tag relies on received signal strength indication (RSSI) measurements from wireless access points to determine the location of the object. In another form of the present invention, location of an object having a tag relies also on received signal strength indication (RSSI) measurements from other location tags to determine the location of the object. The present invention is not restricted in the minimum number of access points to provide accurate estimates of a location. Instead, the present invention uses inexpensive tools for networking purposes in combination with RSSI readings from the available access points and/or from other location tags in addition to filter algorithms that utilize coarse received signal strength-based localizations to provide precise location estimates.

The present disclosure provides for a method of locating and tracking (orienting) objects in terms of a probability distribution where the evolving state of the object is estimated using a Bayesian filter. The recursive Bayesian filter is applied to predict all possible locations which the object may have moved to from its previous location. In accordance with some embodiments of the preferred disclosure, the recursive Bayesian filtering technique used is sequential Monte Carlo filtering (also known as particle filtering or bootstrap filtering).

With the present invention, the following advantages and improvements to current location and tracking systems are featured: (a) readily available and low cost technologies are used to create one or more mesh-networked access points; (b) one-, two-, and three-dimensional (1D, 2D, 3D) mobility sensors (accelerometers, gyroscopes) are calibrated precisely for three-dimensional (3D) (three to six degrees of freedom) usage (c) one or more of these mobility sensors are used to compensate for gravity; (d) filtered motion-based information serves as the system's mobility model in the filter while RSSI readings and their interpretation provide the measurement model.

Another advantage of the present invention includes the fact that most organizations (commercial or otherwise, including residential establishments) are now equipped with wireless access points making the present invention easy to incorporate. In addition, many technology products (including off-the-shelf technologies) are available with factory fitted wireless network adapters. Wireless networking also enables mobility, a key factor in building intelligent mobile devices to perform routine tasks. Accordingly, the present invention makes it easy to be incorporated into such intelligent mobile device, including household devices like vacuum cleaners, remote controls, as they become enabled with wireless technologies.

Those skilled in the art will further appreciate the above-noted features and advantages of the invention together with other important aspects thereof upon reading the detailed description that follows in conjunction with the drawings.

BRIEF DESCRIPTION OF SEVERAL VIEWS OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
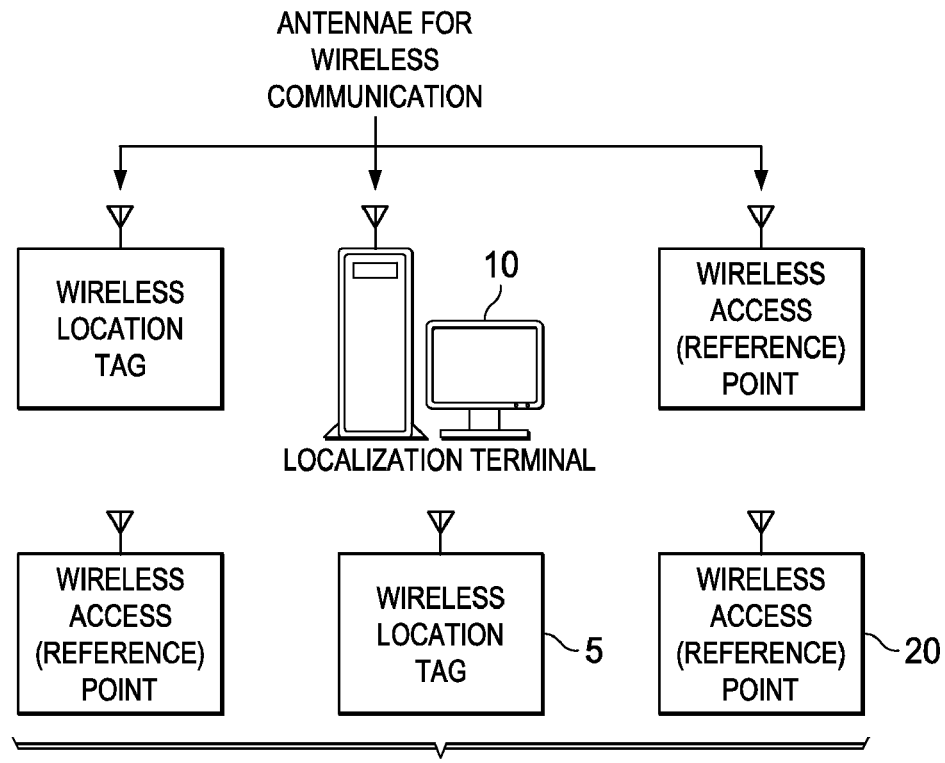
FIG. 1 depicts components of a system in accordance with one aspect of the present invention.

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows, like parts may be marked throughout the specification and drawing with the same reference numerals, respectively. The drawing figures are not necessarily to scale and certain features may be shown exaggerated in scale or in somewhat generalized or schematic form in the interest of clarity and conciseness.

The present invention is unlike previous RSSI localization techniques that use triangulation (a method of determining a relative position of an object using the geometry of triangles by applying angle measurements together with at least one known distance to calculate an object's location) or trilateration (a method of determining the relative position of an object using the geometry of triangles by applying a known location of two or more reference points and a measured distance between an object and each reference point) to compute the distance from one or more fixed points and to determine an object's location relative to such points. The present invention overcomes such narrow interpretations of location by applying a probabilistic time-series approach to received signal strength indication. In particular, the RSSI measurement-based systems of the present invention do not require three or more reference points or additional sensor/actuator infrastructure (e.g., pressure sensitive floors). It may use readily available wireless access points or wireless access points that can be deployed for location purposes but may be used for other communications as well. The strength of the present invention is that RSSI readings are provided by most wireless devices as part of normal operation.

RSSI as referred to herein is a measurement of the strength (not necessarily the quality) of a received signal in a wireless environment, in arbitrary units. RSSI values or measurements can represent the received signal strengths of a mobile unit or a non-mobile (e.g., fixed unit).

Localization as referred to herein indicates, in part, that there are objects in the present invention that are aware of the location of objects with a location tag. Note, that depending on implementation these two objects may be the same, i.e., an object may determine and thus be aware of its own location. This is an important enabler for future ubiquitous computing environments.

Figure 2:
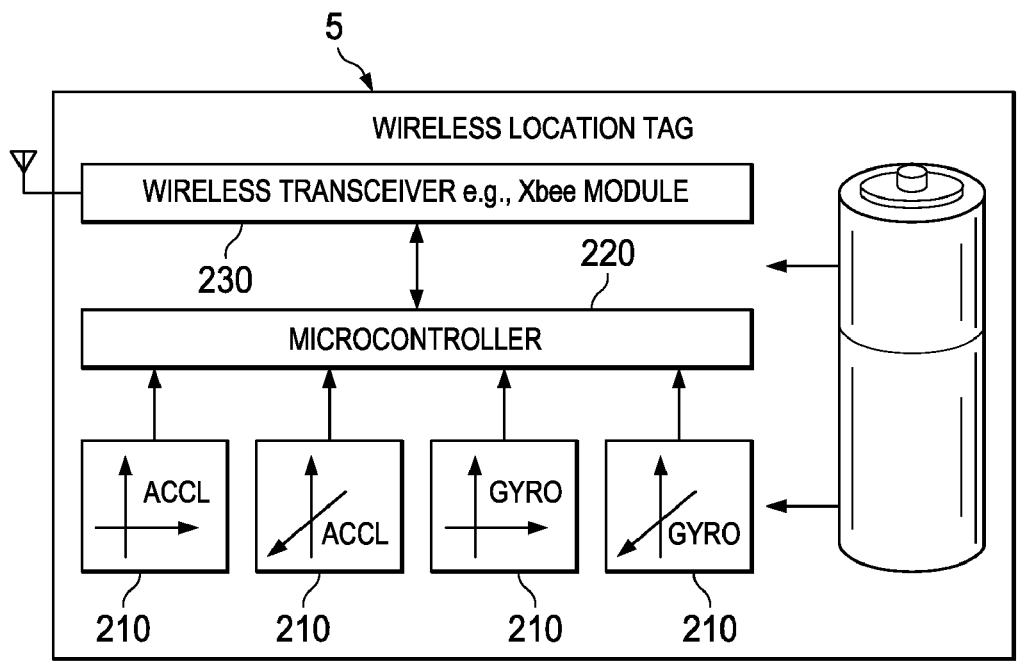
FIG. 2 depicts components of location tags in accordance with one aspect of the present invention.

According to the present invention, systems and methods for localization of at least one object are provided. Each object 5 of the present invention comprises at least one mobility sensor 210 as shown in FIG. 2 that provides sensory information about the mobility of the object, a microcontroller 220 that can sample and apply calibration data to the sensors, and a wireless transceiver 230 that can send and receive data as well as provide RSSI readings of the received data signals. Microcontroller 220 is used to filter sensory data and provide mobility estimates, such as velocity and displacement. Object 5 may send mobility and RSSI data using its transceiver 230 to another unit for location calculation or may calculate its own location based on the same data and then send the location estimate itself. Mobility sensors 210 may include 1, 2, or 3 dimensional accelerometers, and angular rate sensors (e.g., gyroscopes). Mobility sensors convert physical movement into electrical signals. As provided herein, a unit 220 may be a microcontroller, a microprocessor, a highly integrated microprocessor, a single-chip microcomputer, an embedded computer or the like. Examples of wireless transceiver 230 include those that transmit information signals such as electrical or electromagnetic signals via electro-magnetic (e.g., radio) waves.

Figure 3:
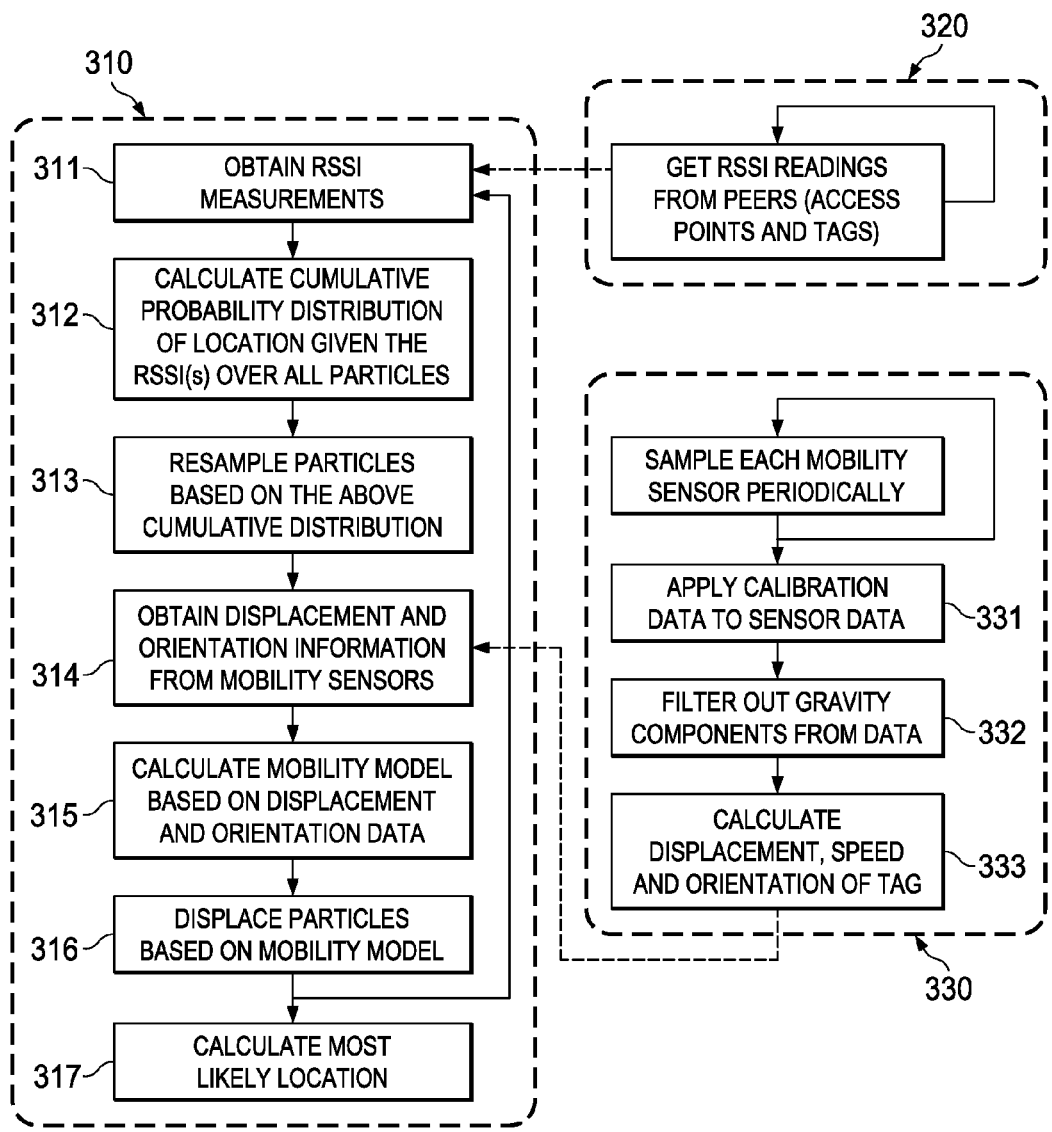
FIG. 3 depicts a high-level overview of a representative algorithm in accordance with one aspect of the present invention.

The microcontroller 220 may run the entire algorithm in FIG. 3, or it may only run sub-algorithms 320 and 330. It may then relay data provided by 320 and 330 using it wireless transceiver 230 to another unit, for example, unit 10 in FIG. 1. Unit 10 then can run sub-algorithm 310 and thus estimate the location of unit 5. Alternatively, if microcontroller 220 has all three parts of the algorithm (310, 320, and 330) it can estimate its own location and relay its location coordinates to other units (e.g., to unit 10).

Objects as referred to herein may be mobile or fixed. Each object of the present invention is equipped with a tag for marking, orienting, tracking and location purposes (also referred to herein as a location tag). As shown in FIG. 2, a representative location tag 5 is shown to include at least one mobility sensor 210 (e.g., accelerometer, angular rate sensor, gravimeter), a microcontroller 220 (e.g., highly integrated microprocessor, a single-chip microcomputer, an embedded computer), and a wireless transceiver 230. Microcontroller 220 may be used to help integrate mobility sensor 210 with wireless communications package 230 (e.g., wireless personal area network or wireless transreceiver, such as a radio-frequency [RF] digital data communication system), to collect sensory data (typically as sample information) about the object and/or process the sensory data (sample information).

Sensory data and RSSI measurements about an object are communicated to/through other unit 5s or unit 20s. The difference between a unit 5 and a unit 20 is that a unit 20's location is known either to itself and/or to a unit 10 in the system. Generally, a unit 20 is fixed, while a unit 5 may be fixed or mobile. Unit 5s may receive radio communications from other unit 5s or unit 20s and can obtain the RSSI of such communications. For every unit (5 or 20) there is an RSSI reading or measurement; however, fixed tags 20 differ from non-fixed tags 5 in that fixed tags do not need mobility sensors. In addition, fixed units 20 have known locations that are predetermined. Hence, marking, orienting, tracking and locating an object having a location tag is performed using: (a) RSSI readings provided by at least one unit 10 (stationary access point or reference access point; a process referred to herein as infrastructure localization); and/or (b) RSSI readings provided by at least one other non-fixed tag 5 (mobile tag or other location tag; a process referred to herein as distributed localization).

A method to obtain a location of an object having a location tag as provided herein uses an algorithm that combines a measurement model using Monte-Carlo signal filtering of RSSI information with a system model that uses a filtered stream from at least one mobility sensor. The measurement model using sampling data provided by an object (via RSSI) captures, follows and calculates, by sampling, a probability distribution of each location of the object at a specific time point (for positional information) or over time (tracking). By applying sampling data in the measurement model, the algorithm as provided herein is particularly useful when one or more tags are not fixed but mobile.

In general, as shown in FIG. 3, the specific form of Monte Carlo filtering as used herein identifies a signal (RSSI reading) projected from an object having a tag and calculates a probability of the tag's location based on the RSSI. Sub-algorithm 310 is used to integrate mobility and RSSI readings and to calculate the probability distribution of the tag's location given the readings.

As such, RSSI-based location identification of an object uses an algorithm capable of working with RSSI readings about an object and presenting location and tracking data about the object. The algorithm includes a method for filtering signals (data) about the object that reduces computational burden while de-discretizing location-space information about the object. Precise but inexpensive location estimates about an object are then presented by the algorithm. Filtering and estimation are necessary to deal with the relatively noisy nature of measurements because walls, humans, and other obstacles (mobile or fixed) affect the strength of a signal. Estimation as referred to herein is a set of techniques that compute a set of possible future states (e.g., positions) based on measurements from a known set of states An example of an algorithm of the present invention is shown in FIG. 3. Sub-algorithm 320 samples the RSSI whenever the unit has received wireless communication. Sub-algorithm 330 provides an estimate of velocity and orientation. Sub-algorithm 310 works as follows: an iteration of the algorithm begins with obtaining RSSI data 311 as collected by 320. Based on this reading and the current state of the particles inside the filter, each particle's probability is recalculated 312, and this respective probability is used to weigh the particle. Then a cumulative distribution of over these new weights of all particles is created and used to resample each particle so they have uniform weights again 313. This may result in particles disappearing from a less likely location and being moved to a more likely location. Mobility readings are then obtained from 330 by 314. A mobility model is created based on these readings in 315, and this model is used to move all particles in 316. After 316, the algorithms loops back to 311. In addition, based on the values associated with this update of the particles, the most likely particle or the most likely value over all particles may be selected as an estimate for the location.

Sub-algorithm 330 applies a de-warp matrix 331 to the data received from different accelerometers; thus any accelerometer configuration that spawns the three dimensional space (e.g., 3 1-D accelerometers, 2 2-D accelerometers, or a 3-D accelerometer) can be used; the output signals of the accelerometers may show different zero acceleration and different 1-g acceleration levels. An off-line calibration method is used to calculate the de-warp matrix solely using the earth's gravitational force as an accelerating force. The de-warp matrix has to be determined for each location tag individually and will correspond to the setup of the accelerometers used therein.

Accelerometers will always be biased by the gravitational force of the earth; thus, in order to obtain acceleration values that do not contain acceleration due to the gravitational force, the earth's gravity needs to be filtered out. This filtering is done by block 332 in FIG. 3.

With the present invention, systems and methods of object localization rely on at least one object having a location tag, the tag being associated with at least one mobility sensor. The mobility sensor is used to track and locate the position of the at least one object. In one system, an infrastructure-based localization is provided in which one or more locations (e.g., movements) of at least one object having a location tag is obtained by RSSI readings transmitted from one or more fixed tags (access point or reference point also referred to as infrastructure). The location for each fixed tag is known. In such a system, a location estimate of the object is based on a fixed tag with a predetermined location; the greater the number of fixed tags, the better the location estimate obtained about each tag.

When the estimate is provided on the tag itself, an algorithm in direct communication with the microcontroller is associated with the tag to provide the location (as an estimate) which is then relayed to one or more fixed tags of the infrastructure. As an alternative or in addition, RSSI readings and sensory information may be relayed as is (as raw signals) to the one or more fixed tags of the infrastructure. For processing of raw signals, the infrastructure is typically provided with a unit 10 in operable communication with the algorithm to process all raw information as well as deduct and determine the location and/or movement of each tag.

Figure 4:
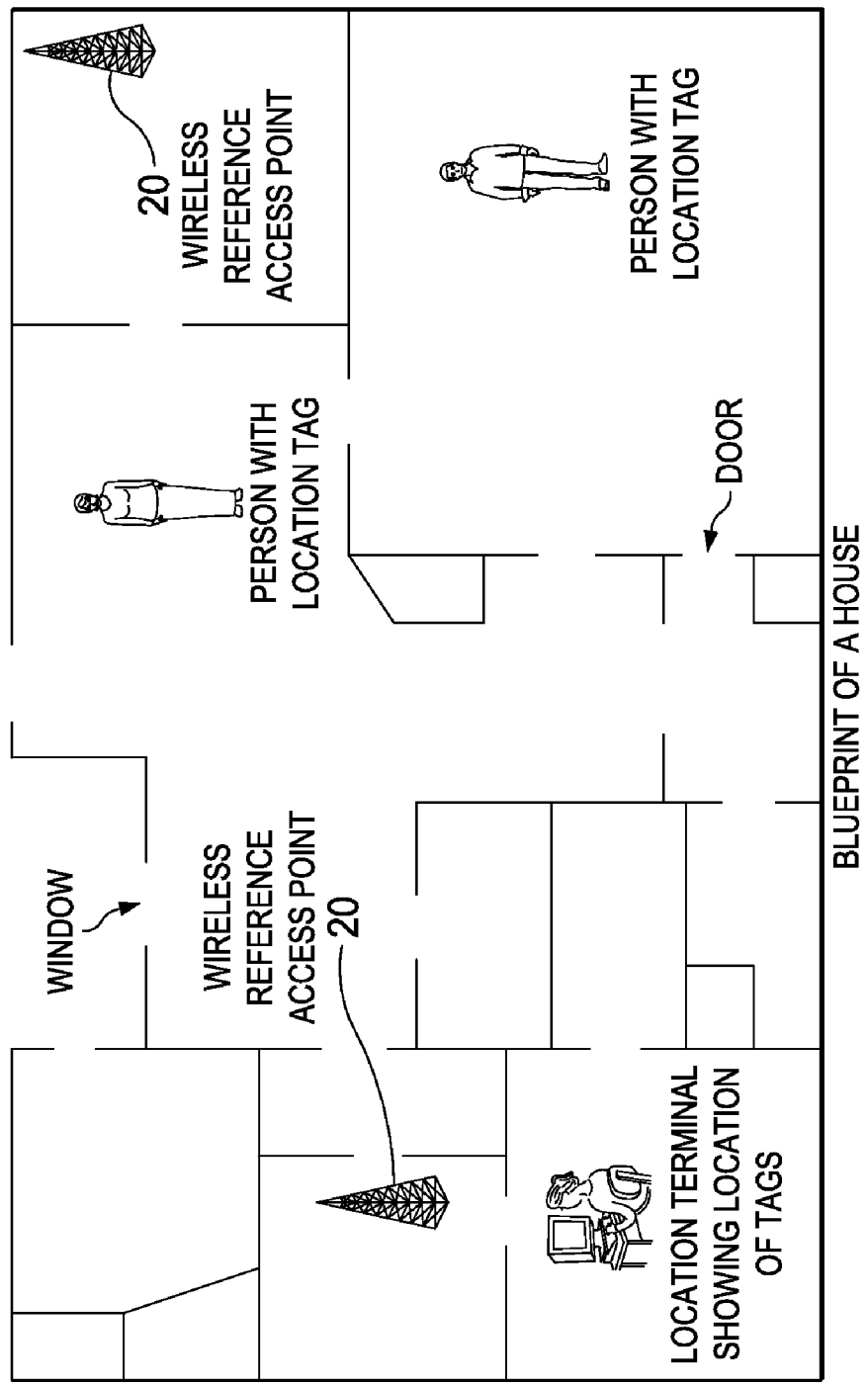
FIG. 4 depicts a representative example of infrastructure localization in accordance with one aspect of the present invention.
Figure 6:
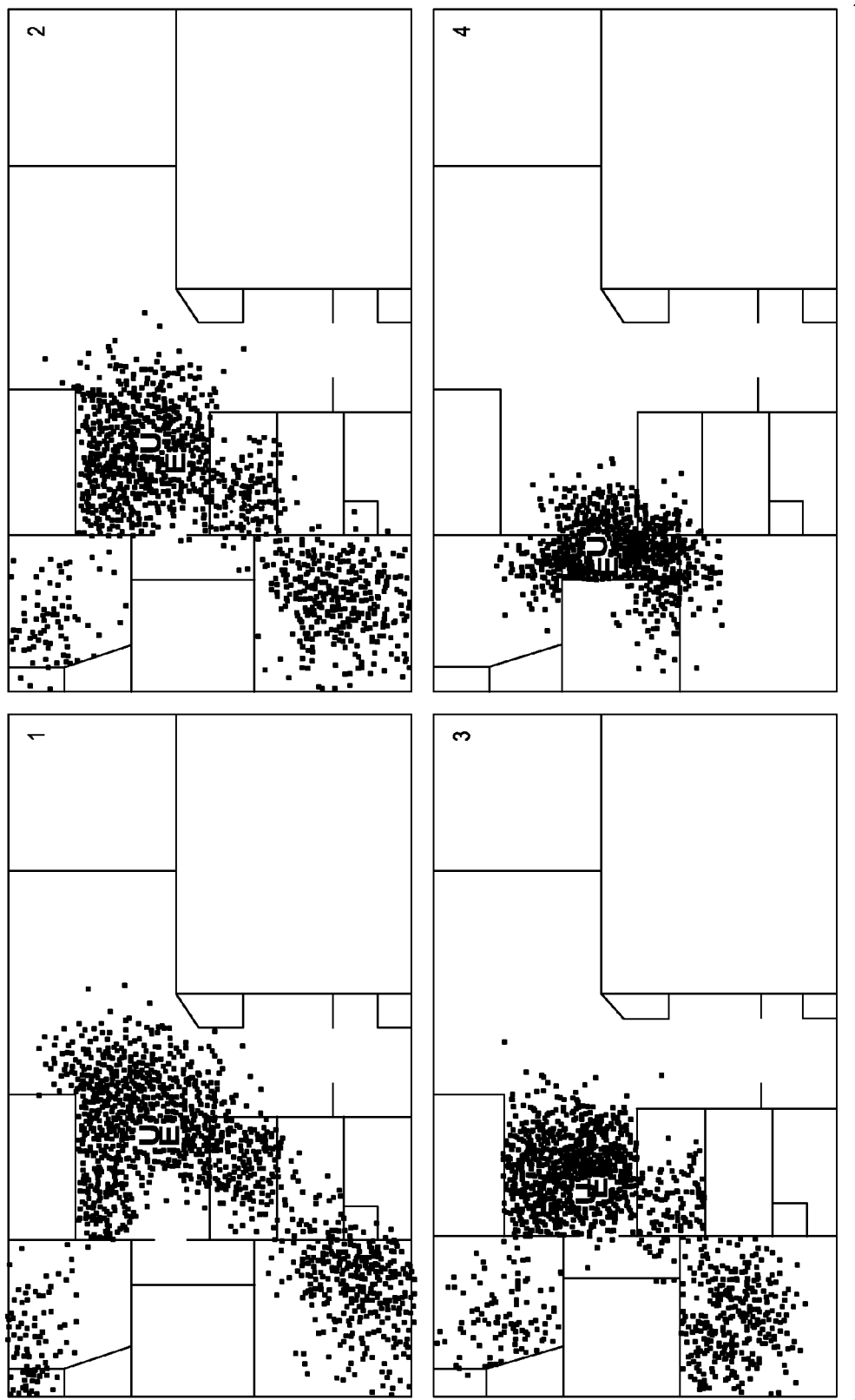
FIG. 6 depicts a representative example of actual and estimated locations in accordance with one aspect of the present invention.

An example of infrastructure-based localization is depicted in FIG. 4. Here, an object (e.g., person, animal, device having wheels) is moving through a building (as depicted by the two standing humans in the figure). Each object has a location tag 5 that includes a wireless communications package and a microcontroller (for example, an IEEE 802.11b wireless transceiver with an RSSI sensor connected to a laptop, or a battery powered small tag using IEEE 802.15.4). In or near the building is a fixed unit 20, (for example an IEEE 802.11b access point, or a simplified 802.15.4 tag—without mobility sensors)—depicted as radio base stations in the figure. The location of this access point is known. The tag's location inside the building may be displayed by the tag itself if it has sufficient capabilities (i.e., it is, or is connected to, a laptop or palmtop) or may be seen on a terminal connected to the same network (the person at the computer in FIG. 4). Location tags are capable of deducing the location and movement of the objects they are attached to. A viewing of the location and movement of the location tag over time may be performed on a computer having a floor map of the building. As shown in FIG. 6, on the computer, the estimated probability density for each tag can be shown (high density of dots in FIG. 6), based on which an estimate may be calculated (e.g., the area that is highest density). In FIGS. 6, 1, 2, 3, and 4 are in a time-sequence. In the figure, U stands for actual location and E stands for estimated location. Thus, the overall location probability is provided as broad clouds; and the actual estimate is the area of the cloud with the highest density.

Another system of the present invention provides for a distributed-based localization in which one or more locations of at least one object having a location tag is obtained using RSSI readings transmitted from other mobile tags. The location of each mobile tag is not known. In such a system, a location estimate of the object is based on RSSI transmissions from at least one other mobile tag. Here, location estimates are based on location estimates of the other tags.

Distributed localization typically does not include any fixed tags having a known location; however, fixed tags may be included in certain embodiments when desired. In such a system, each object having a location tag (including at least one mobility sensor) obtains location information about itself by communicating with other mobile tags (each having at least one mobility sensor). Each object having a location tag measures RSSI readings projected by at least one other mobile tags, deducts the location of the at least one mobile tag, and determines location information about the other tags in order to obtain their own location estimates.

Figure 5:
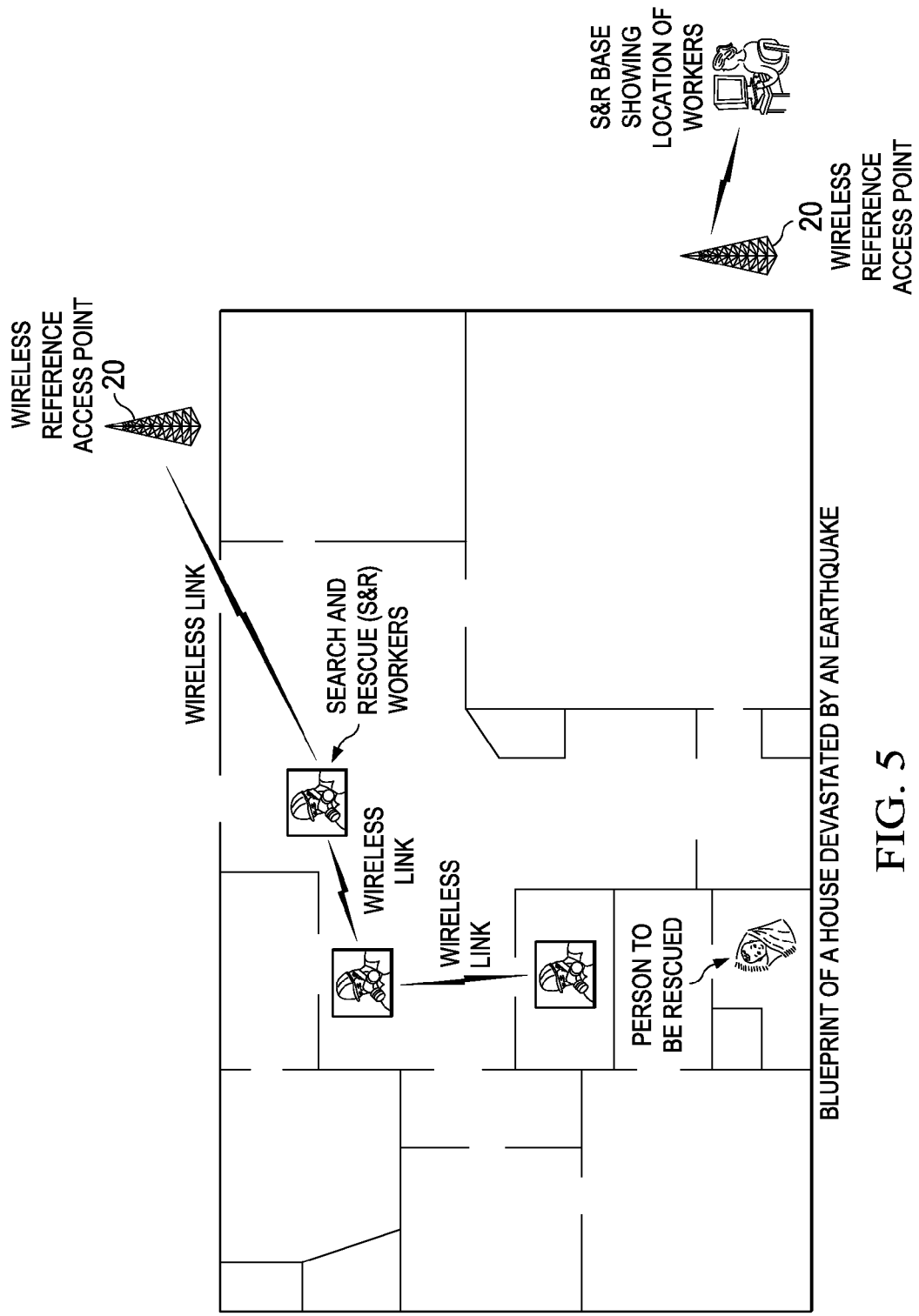
FIG. 5 depicts a representative example of distributed localization in accordance with another aspect of the present invention.

An example of distributed localization is provided as depicted in FIG. 5. Here two objects 20 that do know their location are each placed in a corner of a house that has fallen victim to an earthquake as search and rescue (S&R) workers are attempting to rescue a baby inside. A transmission (and thus RSSI sensing) radius of each object 5 and 20 is only a fraction of the house's area dimensions. Location tags are worn by the S&R workers, and some S&R workers can only communicate to other S&R workers due to restricted wireless propagation. The estimate of the location tags of the S&R workers is thus based on the location estimates of other S&R workers' tags. S&R workers may carry equipment to show their own location inside the ruin or may relay their information to the S&R base where an operator (human with computer in FIG. 5) can obtain all the S&R workers' locations.

Accordingly, precise location estimates of one or more objects are provided with the present invention. Readily available and low cost technologies currently available are herein incorporated to increase efficiency and cost-effectiveness of the present invention. The low cost technologies are used to create one or more mesh-networked access points to read the location of one or more objects.

Additional objects, advantages and novel features of the invention as set forth in the description, will be apparent to one skilled in the art after reading the foregoing detailed description or may be learned by practice of the invention. The objects and advantages of the invention may be realized and attained by means of the instruments and combinations particularly pointed out here.

What is claimed is:

1. A system for locating objects, comprising:
    an object having a location tag, the location tag comprising:
        a mobility sensor to detect physical movement of the object and to provide sensory information pertaining to movement of the object;
        a wireless transceiver unit to provide received signal strength indication (RSSI) information;
        a processing unit coupled to the mobility sensor and to the wireless transceiver unit, the processing unit to cause the wireless transceiver to transmit data about the object, the data including the sensory information and the RSSI information; and
        at least one algorithm for processing the sensory information and the RSSI information to calculate a location estimate about the object and thereby locate the object, wherein calculating the location estimate is based at least in part on a mobility model and a measurement model.

2. The system of claim 1, wherein the system further comprises a wireless communications system or network.

3. The system of claim 2, wherein the wireless communications system comprises a wireless transceiver and a wireless local area network, a wireless metropolitan area network, or a wireless personal area network.

4. The system of claim 1, wherein the mobility sensor is an accelerometer, an angular rate sensor, a gyroscope, or a gravimeter.

5. The system of claim 1, wherein the processing unit is a microprocessor, a microcontroller, a processor, a single-chip microcomputer, or an embedded computer.

6. The system of claim 1, wherein the location tag is associated with a node at a fixed location.

7. The system of claim 1, wherein the location tag is associated with a central node at a fixed location.

8. The system of claim 1, wherein the algorithm, when executed by the location tag, to perform operations comprising:
    creating the mobility model for the object, based at least in part on the sensory information from the object pertaining to movement of the object;
    creating the measurement model for the object, based at least in part on the RSSI information; and
    calculating the location estimate for the object, based at least in part on the mobility model and the measurement model.

9. The system of claim 8, wherein the algorithm, when executed by the location tag, to perform operations further comprising:
    wherein the operation of creating the measurement model comprises creating a probability distribution of estimated locations for the object at particular points in time, based at least in part on the RSSI information;
    wherein creation of the probability distribution involves (a) calculating probabilities for particles based on current states of the particles, (b) using the calculated probability for each particle to weigh said particle, (c) creating a cumulative distribution of new weights of all particles, and (d) using the cumulative distribution to resample each particle so the particles have uniform weights; and
    wherein the operation of resampling each particle so the particles have uniform weights comprises potentially moving a particle from a less likely estimated location to a more likely estimated location.

10. The system of claim 9, wherein the operation of calculating the location estimate for the object, comprises:
    displacing the resampled particles, based on the mobility model; and
    after displacing the resampled particles, selecting a displaced particle as the location estimate for the object, based at least in part on probabilities associated with the displaced particles.

11. A method for locating an object, comprising:
    obtaining received signal strength indication (RSSI) information from the object, wherein the RSSI information is transmitted from a wireless transceiver unit associated with the object;
    obtaining sensory information pertaining to movement of the object, wherein the sensory information is transmitted from a mobility sensor associated with the object;
    receiving the sensory information and RSSI information about the object at a processing unit;
    processing the sensory information and RSSI information about the object in at least one algorithm that provides a location estimate about the object and thereby locates the object, wherein providing the location estimate is based at least in part on a mobility model and a measurement model.

12. The method of claim 11, wherein the sensory information is obtained from a device capable of detecting a change in motion of the object as a linear or rotational value.

13. The method of claim 11, wherein the processing unit is a microcontroller.

14. The method of claim 11, wherein the RSSI information about the object and sensory information about the object are transmitted as raw data to the processing unit.

15. The method of claim 11, wherein the RSSI information is obtained from a wireless device that transmits electromagnetic signals.

16. The method of claim 11, wherein the algorithm samples RSSI information and combines it with cumulative sensory information about object movement to estimate displacement and location of the object.

17. The method of claim 11, further comprising:
creating the mobility model for the object, based at least in part on the sensory information from the object pertaining to movement of the object;
creating the measurement model for the object, based at least in part on the RSSI information; and
calculating the location estimate for the object, based at least in part on the mobility model and the measurement model.

18. The method of claim 17, further comprising:
wherein the operation of creating the measurement model comprises creating a probability distribution of estimated locations for the object at particular points in time, based at least in part on the RSSI information;
wherein creation of the probability distribution involves (a) calculating probabilities for particles based on current states of the particles, (b) using the calculated probability for each particle to weigh said particle, (c) creating a cumulative distribution of new weights of all particles, and (d) using the cumulative distribution to resample each particle so the particles have uniform weights; and
wherein the operation of resampling each particle so the particles have uniform weights comprises potentially moving a particle from a less likely estimated location to a more likely estimated location.

19. A method to calibrate a set of mobility sensors for locating an object, comprising:
sampling raw sensory information from each mobility sensor periodically;
applying a de-warp matrix to the raw sensory information to determine mobility sensor output, wherein the mobility sensor output is modified to provide readings in a normalized ego-centric mobility coordinate system;
obtaining displacement and orientation information of the object from mobility sensors output; and
calculating mobility model based at least in part on displacement and orientation information of the object.

20. The method of claim 19, wherein an offline algorithm is used to derive the de-warp matrix that can be applied to the raw sensory information.

21. A method, comprising:
compensating for the gravitational force of the earth in mobility sensor readings to locate an object, comprising:
sampling raw sensory information from each mobility sensor periodically;
filtering out gravitational force components from the raw sensory information to determine mobility sensor output;
obtaining displacement and orientation information of the object from mobility sensors output; and
calculating mobility model based at least in part on displacement and orientation information of the object.

* * * * *